US012173781B2

(12) United States Patent
Cariccia et al.

(10) Patent No.: US 12,173,781 B2
(45) Date of Patent: Dec. 24, 2024

(54) FILTERING PULLEY

(71) Applicant: PROPULSION SOLUTIONS S.R..L., Ivrea (IT)

(72) Inventors: Gianluca Cariccia, Ivrea (IT); Andrea Guala, Ivrea (IT); Stefano Amadio, Ivrea (IT); Jacopo Spinelli, Ivrea (IT)

(73) Assignee: PROPULSION SOLUTIONS S.R.L., Ivrea (IT)

( * ) Notice: Subject to any disclaimer, the term of this patent is extended or adjusted under 35 U.S.C. 154(b) by 0 days.

(21) Appl. No.: 18/560,722

(22) PCT Filed: May 17, 2022

(86) PCT No.: PCT/IB2022/054564
§ 371 (c)(1),
(2) Date: Nov. 14, 2023

(87) PCT Pub. No.: WO2022/243858
PCT Pub. Date: Nov. 24, 2022

(65) Prior Publication Data
US 2024/0288057 A1   Aug. 29, 2024

(30) Foreign Application Priority Data

May 17, 2021   (IT) .......................... 102021000012626

(51) Int. Cl.
*F16H 55/36*   (2006.01)
(52) U.S. Cl.
CPC ....... *F16H 55/36* (2013.01); *F16H 2055/366* (2013.01)
(58) Field of Classification Search
CPC .... F16H 55/36; F16H 2055/366; F16H 55/49; F16D 3/12

USPC ............................................................ 474/94
See application file for complete search history.

(56) References Cited

U.S. PATENT DOCUMENTS

| | | | | |
|---|---|---|---|---|
| 6,161,512 A * | 12/2000 | Beels Van Heemstede | ................. | F16F 15/129 123/90.31 |
| 8,317,642 B2 * | 11/2012 | Hartmann | ............... | F02B 63/04 474/94 |
| 8,632,431 B2 * | 1/2014 | Pflug | ....................... | F16H 55/36 474/94 |
| 8,641,563 B2 * | 2/2014 | Mende | ................ | F16F 15/1297 474/94 |
| 8,789,670 B2 * | 7/2014 | Antchak | ............... | F16D 41/206 192/55.61 |
| 9,163,713 B2 * | 10/2015 | Yoon | ....................... | F16H 55/36 |
| 9,239,093 B2 * | 1/2016 | Varin | ...................... | F16H 55/36 |
| 9,726,253 B2 * | 8/2017 | Yoon | ....................... | F16F 15/123 |

(Continued)

OTHER PUBLICATIONS

International Search Report and Written Opinion, Application No. PCT/IB2022/054564, Jun. 28, 2022, p. 1-12.

*Primary Examiner* — Henry Y Liu
(74) *Attorney, Agent, or Firm* — FisherBroyles, LLP; Susan M. Oiler

(57) ABSTRACT

Filtering pullies with a hub adapted to be fixed to a rotating shaft, a crown mounted coaxially and rotationally free on the hub, at least one elastic group arranged circumferentially with respect to the hub and the crown and interposed, each, between a pair of first elements integral with the hub and between a pair of second elements integral with the crown are disclosed. The at least one elastic group is placed with a circumferential interference ($\beta$) with respect to the first elements integral with said hub.

9 Claims, 4 Drawing Sheets

(56) References Cited

U.S. PATENT DOCUMENTS

| | | | | |
|---|---|---|---|---|
| 10,066,727 B2* | 9/2018 | Bourgeais | | F16D 41/206 |
| 10,267,405 B2* | 4/2019 | Dell | | B60K 25/02 |
| 10,359,084 B2* | 7/2019 | Hauck | | F16H 7/0827 |
| 10,753,453 B2* | 8/2020 | Cariccia | | F16F 15/123 |
| 10,781,907 B2* | 9/2020 | Cariccia | | F16H 55/36 |
| 11,415,211 B2* | 8/2022 | Varin | | F16H 55/36 |
| 11,815,172 B2* | 11/2023 | Cariccia | | F16F 15/1234 |
| 2005/0250607 A1* | 11/2005 | Jansen | | F16H 55/36 474/69 |
| 2010/0167856 A1* | 7/2010 | Hartmann | | F02B 63/04 474/94 |
| 2011/0263365 A1* | 10/2011 | Mende | | F16F 15/1297 474/94 |
| 2013/0062155 A1* | 3/2013 | Varin | | F16F 15/1213 192/41 S |
| 2013/0284139 A1* | 10/2013 | Staley | | F16F 15/1442 474/94 |
| 2015/0072813 A1* | 3/2015 | Yoon | | F16H 55/36 474/94 |
| 2015/0260233 A1* | 9/2015 | Boyes | | F16F 15/12333 474/94 |
| 2015/0316138 A1* | 11/2015 | Dell | | F16H 55/36 474/94 |
| 2016/0091048 A1* | 3/2016 | Tran | | F16F 15/12373 474/94 |
| 2016/0123453 A1* | 5/2016 | Starodoubov | | F16H 7/18 474/94 |
| 2016/0138699 A1* | 5/2016 | Dell | | F16F 15/123 267/168 |
| 2016/0146328 A1* | 5/2016 | Dell | | B60K 25/02 474/94 |
| 2016/0153519 A1* | 6/2016 | Yoon | | F16H 7/02 474/94 |
| 2016/0195182 A1* | 7/2016 | Cariccia | | F16H 55/36 474/94 |
| 2016/0201757 A1* | 7/2016 | Tran | | F02N 11/04 474/94 |
| 2018/0003282 A1* | 1/2018 | Bourgeais | | F16D 3/12 |
| 2018/0038424 A1* | 2/2018 | Hauck | | F16D 3/12 |
| 2018/0045288 A1* | 2/2018 | Cariccia | | F16H 55/36 |
| 2018/0051792 A1* | 2/2018 | Cariccia | | F16F 15/123 |
| 2019/0323592 A1* | 10/2019 | Varin | | F16H 55/36 |
| 2020/0208728 A1* | 7/2020 | Cariccia | | F16F 15/1234 |

* cited by examiner

FILTERING PULLEY

CROSS-REFERENCE TO RELATED APPLICATIONS

The present invention is filed under 35 U.S.C. § 371 as the U.S. National Phase of International Patent Application No. PCT/IB2022/054564, filed May 17, 2022, which designated the United States and which claims the benefit of Italian Patent Application No. 102021000012626, filed on May 17, 2021, the entire disclosure of which is incorporated herein by reference.

TECHNICAL FIELD OF THE INVENTION

The present invention relates to a filtering pulley, preferably a pulley for a crankshaft in an accessory drive of an internal combustion engine.

STATE OF THE ART

As is known, the drive shaft in internal combustion engines is subjected to torsional vibrations due to the periodic stress caused by the combustion in the cylinders. Such vibrations are particularly intense at the start and at low speeds, as well as in the presence of particular constructional solutions such as, for example, the use of double clutch gearboxes or start-stop systems.

The vibrations in rotational torsional result irregularities of the drive pulley of the accessory drive which are transmitted to the accessories by means of the drive belt, which is thus subjected to periodic tension variations.

With the object "to filter" the torsional oscillations transmitted from the crankshaft to the belt, a filtering pulley is generally used as drive pulley, said filtering pulley being provided with a hub integral with the drive shaft, a crown cooperating with the belt and one or more elastic elements through which the torque is transmitted from the hub to the crown. An example of such filtering pulley is illustrated in WO2016/151455 A1.

However, in the pulleys, according to the prior art, there is noise due to the impact of the actuator element on the elastic elements and of the elastic elements in their seats between hub and crown.

Such noise, clearly, is irritating for the user, generates losses of energy, increases the wear between the parts and, consequently, decreases the useful life of the pulley.

The object of the present invention is to manufacture a filtering pulley which solves the aforementioned technical problem in a simple and cost-effective manner.

Subject and Summary of the Invention

The aforementioned object is achieved by a filtering pulley according to the claim of the appended claims.

BRIEF DESCRIPTION OF THE DRAWINGS

In order to better understand the present invention, a preferred embodiment is described in the following, by way of non-limiting example and with reference to the accompanying drawings, wherein.

DETAILED DESCRIPTION OF PREFERRED EMBODIMENTS OF THE INVENTION

Figure 1:
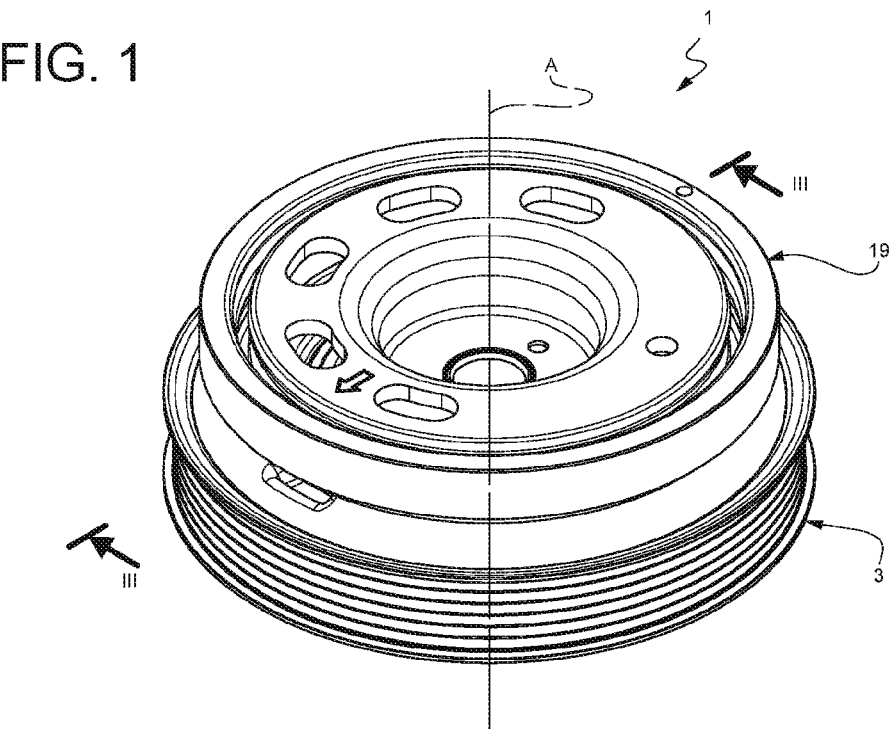
FIG. 1 is a perspective view of a filtering pulley according to the invention.

In the accompanying figures, a filtering pulley 1 is represented comprising a hub 2 of axis A, adapted to be connected to a shaft (not represented), for example a crankshaft of an internal combustion engine, and an annular crown 3 externally coaxial to the hub 2 and supported in a rotationally free manner on the hub 2 by means of a supporting element 4, such as a bush.

The crown 3 comprises an annular portion 5 provided with a profile 6 adapted to cooperate with a poly-V belt (not represented). The crown 3 further comprises a radial wall 7, integral with the annular portion 5 and preferably of a single piece therewith, extending radially towards the hub 2, and a substantially cylindrical internal wall 8 of axis A.

The crown 3 carries, integral thereto, a closing element 11 comprising an outer cylindrical wall 12 of axis A, a flat radial annular wall 13. The closing element 11 is driven into the crown 3 so as to form an annular chamber 15 radially comprised between the wall 12 and the wall 8 and axially delimited by the wall 7 and the wall 13.

Figure 3:
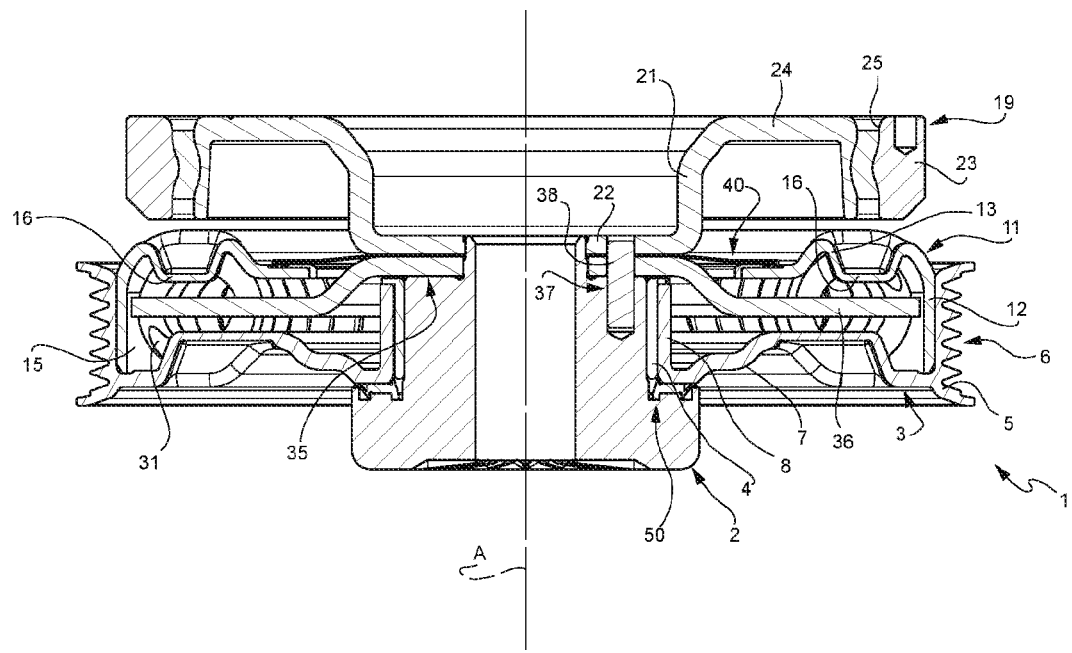
FIG. 3 is a sectional view according to line III-III of the pulley of FIG. 1.
Figure 2:
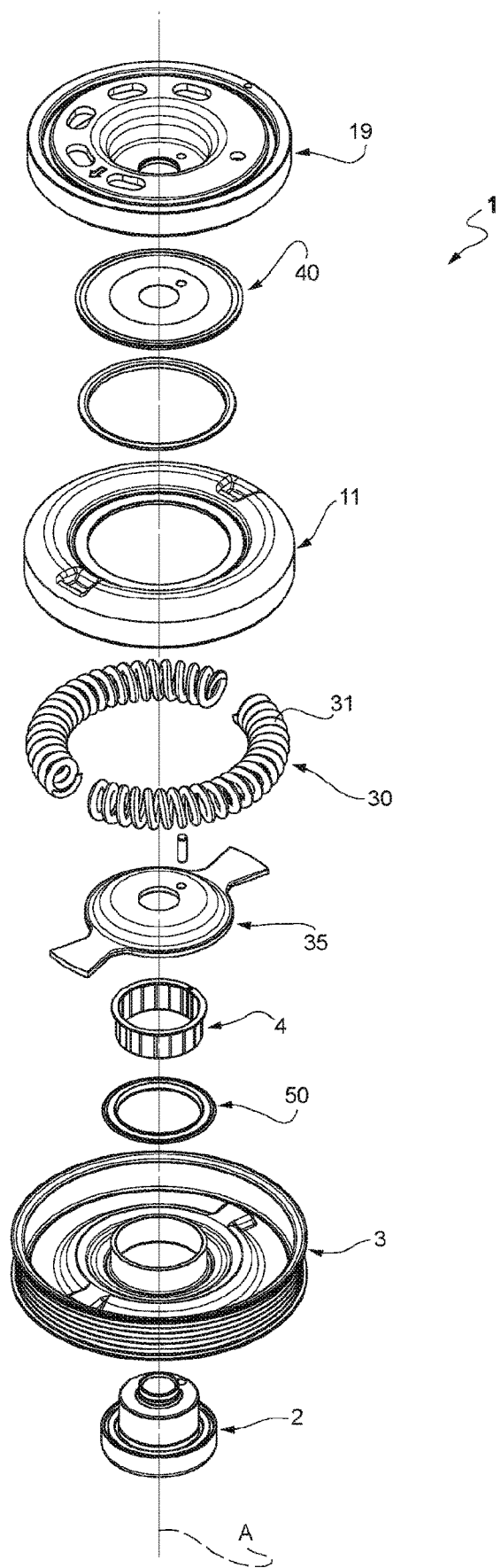
FIG. 2 is an exploded view of the pulley of FIG. 1.
Figure 4:
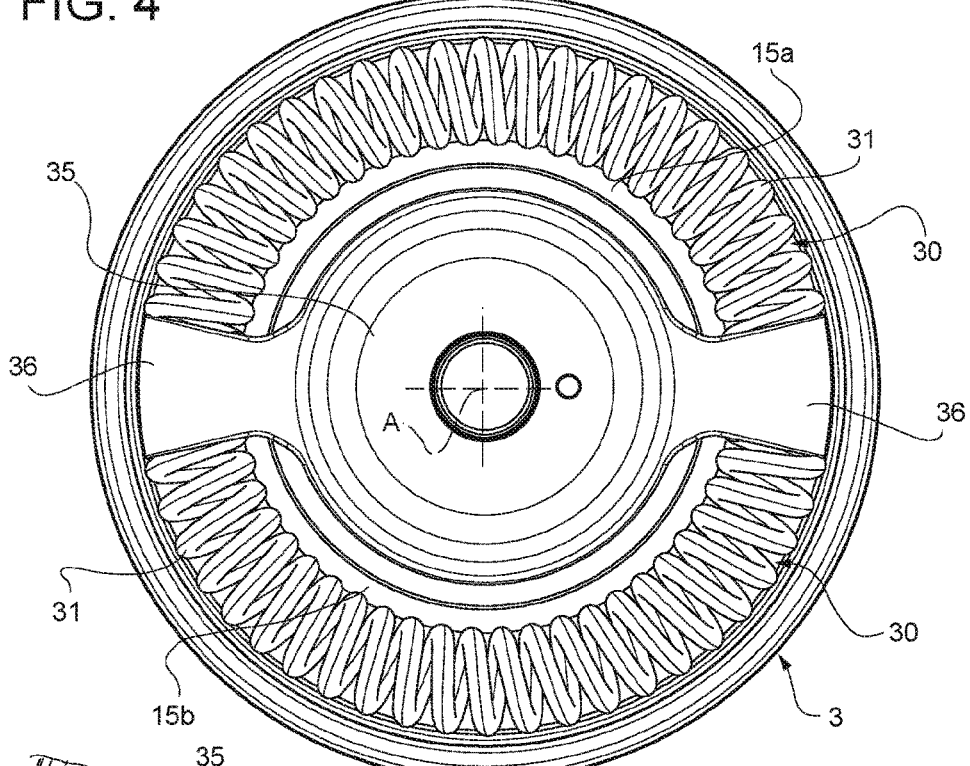
FIG. 4 is a top view of the pulley of FIG. 1 with parts removed for clarity.

The closing element 11 finally comprises two diametrically opposite projections 16 axially extending inside the chamber 15 starting from the wall 13 (see FIG. 3). The projections 16 divide the chamber 15 into two portions 15a, 15b, preferably of equal dimensions.

On the wall 7 stop elements are provided, such as further two projections (not illustrated) preferably arranged at 180° with respect to the projections 16, thus substantially in the middle of the respective aforementioned portions 15a, 15b of the chamber 15. The projections 16 and the stop elements are carried fixed by the respective walls or, alternatively, made of a single piece with the same.

The pulley 1 can further be provided with a dynamic damper 19 comprising a disc 21, facing the closing element 11 and having a portion of hub 22 integral with the hub 2, and a seismic ring 23 constrained to a peripheral flange 24 of the disc 21 by a ring 25 of elastomeric material.

As is illustrated, the pulley 1 further comprises at least one elastic group 30, for example two elastic groups 30 arched and arranged circumferentially free in the respective portions 15a, 15b of the chamber 15 delimited by the projections 16.

Each of the elastic groups 30 comprises at least one spring, in the described case a helical and arched spring 31 mounted between the aforementioned projections 16.

The pulley 1 further comprises an actuator 35 integrally carried by the hub 2 and advantageously axially interposed between the hub 2 and the disc 21 of the dynamic damper 19. The actuator 35 has two spokes 36 free to move circumferentially in the chamber 15 and adapted to interact with the elastic groups 30 by contact as described in the following.

Advantageously the actuator 35 is carried by the hub 2 by means of a shape coupling 37, for example by means of a pin 38 configured to be inserted in respective openings of the actuator 35 and of the hub 2. Preferably, the shape coupling 37 allows the coupling also of the disc 21 of the dynamic damper 19 to the hub 2, hence it comprises an opening adapted to the insertion of the pin 38.

The pulley 1 can further comprise a dust protection system 40 configured to isolate the space 15 from the outside and extending between the wall 13 of the element 11 and the hub 2.

The pulley 1 can further comprise a dust protection lip 50 configured to prevent the contamination from the outside of the rotating support 4 between hub 2 and crown 3. Such dust protection lip 50 is placed axially between hub 2 and crown 3, facing the rotating support 4 on an internal radial side and open towards the outer radial side.

Figure 5:
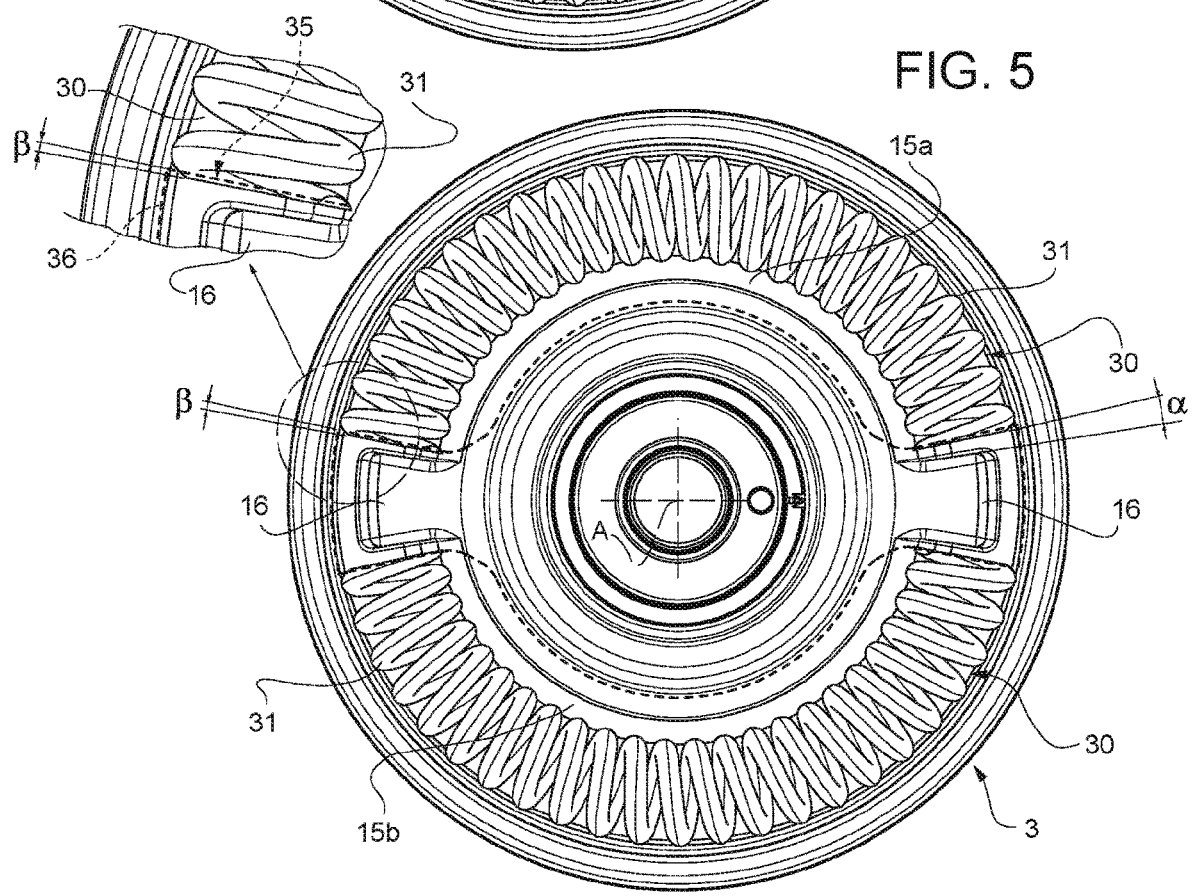
FIG. 5 is a top view of the pulley of FIG. 4 with further parts removed for clarity and provided with an enlarged detail.

Preferably, as visible in FIG. 5, the stroke of the elastic groups 30 in the respective portions 15a, 15b can be given by an angular play α present between each of the elastic groups 40 arranged in contact with one of the projections 16 and the other projection 16.

According to the invention, the actuator 35 is placed in contact with the elastic groups 30 with a circumferential interference value β so as to preload the elastic groups 30 inside the seat 15.

As visible in the enlarged detail of FIG. 5, the circumferential interference value β is thus provided between the actuator and the elastic group 30 which can be housed in contact or with the angular play α in its seat. The circumferential angular value β can be comprised between 0.5° and 5°, in circumferential direction.

Figure 6:
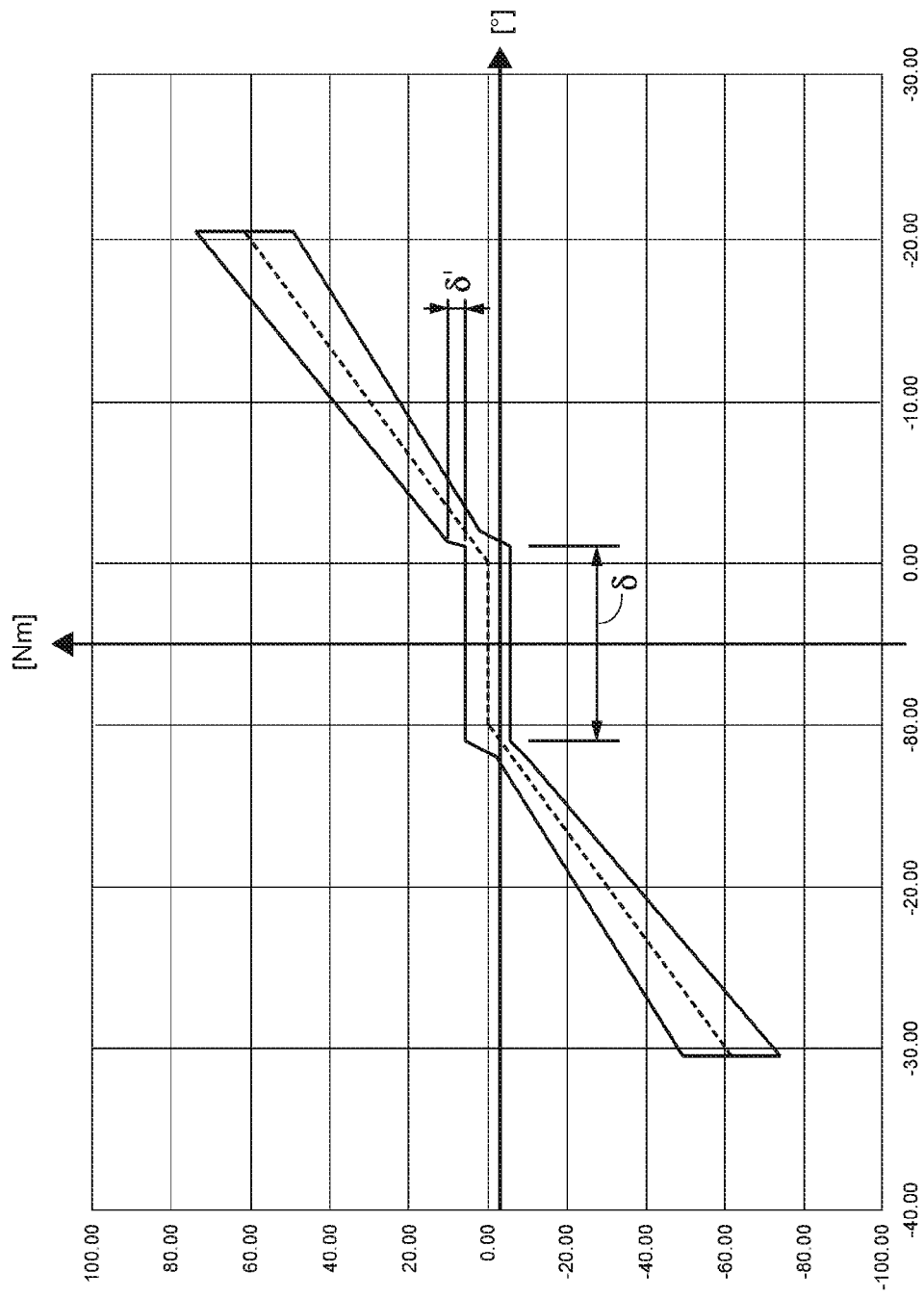
FIG. 6 is a diagram illustrating a feature of torque transmittable by the pulley according to the invention.

The operation of the pulley 1 is described in the following by referring to the graph of FIG. 6, which represents the torque transmitted by the pulley 1 depending on the relative rotation angle between the crown 3 and the hub 2.

In a first operational step, called driving mode and constituting the normal operation of the pulley 1, when the drive shaft pulls the accessories, the speed of the hub 2 tends to exceed the speed of the crown 3. For this reason, the spokes 36 of the actuator 35 transmit the torque to the projections 16 with the interposition of the respective elastic groups 30.

What described above occurs, symmetrically, in the overrunning condition, i.e. when the speed of the crown 3 tends to exceed the speed of the hub 2.

The hysteresis of the curve is given by the damping present between the hub 2 and the crown 3, as known per se.

In case of important angular variations which could damage the elastic groups 30, the stop elements prevent excessive relative rotation between hub 2 and crown 3.

However, as it can be noted, there is a free rotation angle δ between hub 2 and crown 3, hence torque is not transmitted despite the relative rotation between these two elements.

The free rotation angle δ is given by the free angle present between the elastic groups 30 and the respective projection 16. In fact, the spoke 36 first starts rotating loadless until the elastic groups 30 meet the respective projection 16.

After such free angle, there is an angular value δ' in which the actuator 35 has to exceed the preload value set by the circumferential interference with the elastic group 30 before compressing it and start to compress transmitting torque. Consequently, such angular value δ' has a different slope, substantially almost vertical, where the actuator 35 does not move until the preload value given to the elastic groups 30 is exceeded.

Furthermore, it is to be noted that the circumferential precompression between the spokes 36 of the elastic groups 30 prevents the presence of axial movements which can make the elastic groups 30 beat inside the respective seats 15a, 15b.

The advantages of a pulley 1 according to the invention are thus evident.

The presence of a circumferential interference between the spokes of the actuator and the elastic groups allows increasing the damping between hub and crown.

Furthermore, the aforementioned interference prevents any beats between the spokes of the actuator and the elastic groups, as already driving, as well as between the elastic groups in their seats due to movements in axial direction.

Still, the interference, by reducing the movements and the aforementioned beats, reduces the noises, the wear and thus the possibilities of breaking with respect to the known pulleys.

By varying the circumferential interference, it is thus possible to vary the feature of the spring according to the design requirements.

Finally, it is clear that modifications or variations can be made to the described pulley which do not depart from the scope of protection defined by the claims.

First of all, the pulley could be used not exclusively on the crankshaft of an internal combustion engine but for one of the accessories of the same.

With reference to the elastic group 30, they could be manufactured without anyway modifying their function. For example, they could comprise springs of different nature or several springs, in series or in parallel. Still, the elastic groups could be four and likewise the spokes of the actuator.

The dynamic damper 19 could be absent and the actuator could be carried differently by the hub 2. Likewise, the bush could be replaced by roller bearings.

Still, the angular values α, β could have different width depending on the torsional dynamic behaviour of the drive shaft in the specific application.

Still, one or more damping devices could be present.

The invention claimed is:

1. Filtering pulley comprising a hub adapted to be fixed to a shaft rotating around an axis (A), a crown mounted coaxially and rotationally free on said hub, at least one elastic group arranged circumferentially with respect to said hub and said crown and interposed, each, between a pair of first elements integral with said hub and between a pair of second elements integral with said crown, characterized in that said at least one elastic group is placed with a circumferential interference (β) with respect to said first elements integral with said hub wherein said circumferential interference (β) varies between 0.5° and 5°.

2. The filtering pulley according to claim 1, wherein said at least one elastic group is a helical wire spring.

3. The filtering pulley according to claim 1, wherein said at least one elastic group is placed between said hub and said crown with an angular play (α) of free sliding with respect to said pair of second elements.

4. The filtering pulley according to claim 1, wherein said first elements comprise at least two spokes carried by an actuator integral with the hub.

5. The filtering pulley according to claim 4, wherein said actuator is carried by said hub by means of a shape coupling.

6. The filtering pulley according to claim 1, wherein said second elements are projections integral with an element of said crown.

7. The filtering pulley according to claim 6, wherein said at least one elastic group is circumferentially sliding inside a seat formed between said first elements and/or said second elements.

8. The filtering pulley according to claim 1, characterized in that it comprises a dynamic damper.

9. The filtering pulley according to claim 1, characterized in that it comprises stop elements carried solidly by one of said hub and said crown configured to prevent excessive angular rotation between said hub and said crown.

* * * * *